Nov. 4, 1952   J. D. SARAKAS   2,616,203
ATTACHMENT FOR FISHHOOKS
Filed March 20, 1950
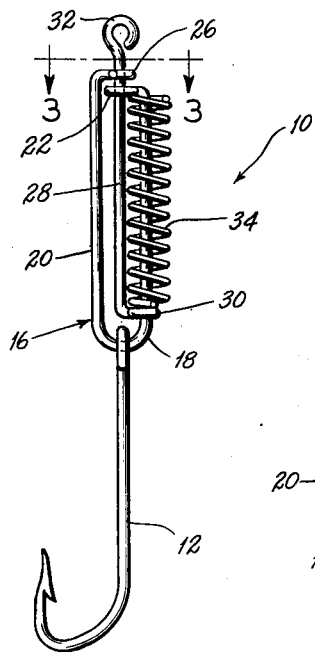
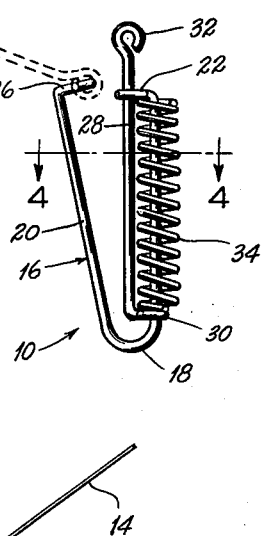
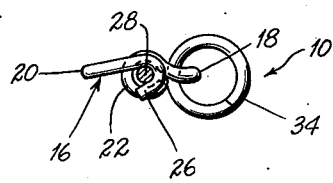
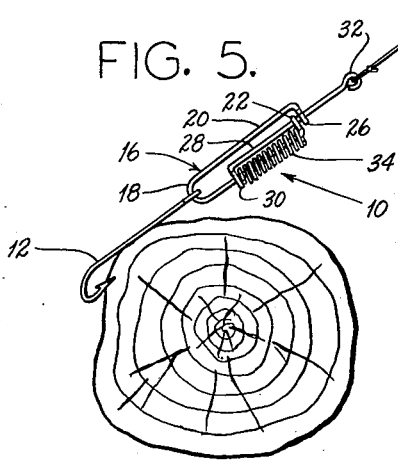
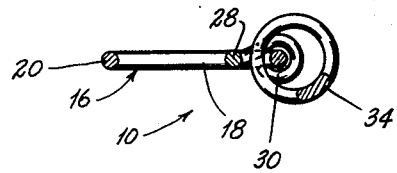
INVENTOR:
JOSEPH D. SARAKAS
By Kingsland, Rogers & Ezell
ATTORNEYS Patented Nov. 4, 1952

2,616,203

UNITED STATES PATENT OFFICE 2,616,203

ATTACHMENT FOR FISHHOOKS

Joseph D. Sarakas, St. Louis, Mo.

Application March 20, 1950, Serial No. 150,774

3 Claims. (Cl. 43—17.2)

The present invention relates generally to the fishing art, and more particularly to a novel attachment for fishhooks to aid in dislodging them from submerged obstacles on which they have become caught while in use.

In one form, the attachment comprises a U-shaped member of resilient wire or the like which has the free end of one of its leg elements bent to form a ring and the free end of the other leg element bent to form a hook. An elongated wire-like member is slidably disposed in the ring. The elongated member has a ring at one end which is disposed about the leg element which slidably supports said member and the other end of the elongated member is bent to form an eye to receive the end of a fish line. The hook on said other leg element is adapted to be removably engaged about the elongated member so that a fishhook can be slipped on and removed from said other leg element at will. A coiled spring is disposed around the one leg element between the two rings so as to urge them apart.

It is an object of the present invention to provide a novel attachment for fishhooks which will aid in dislodging an embedded fishhook from an obstacle when the fisherman is in a position removed from the fishhook.

More particularly, it is an object of the present invention to provide an attachment which will exert a sudden rearward force against the shank end of an embedded fishhook responsive to the action of the fisherman at a position removed from the fishhook.

Specifically, it is an object of the present invention to utilize the force of a coiled spring which has been compressed by pulling on the fish line, to strike a sudden blow against the shank end of an embedded fishhook so as to dislodge the same.

Another object is to provide an attachment of this type whereby hooks of various sizes can be easily and quickly attached to and removed from said attachment.

Another object is to provide an attachment of this type which is of rugged construction and simple design, and which is relatively inexpensive to manufacture.

Further objects and advantages of the present invention will be apparent from the following description, reference being had to the accompanying drawing wherein a preferred embodiment of the present invention is shown, in which:

Fig. 1 is a side elevational view of an attachment embodying the present invention, shown with a fishhook disposed thereon;

Fig. 2 is a view similar to Fig. 1 but showing the latch portion disengaged and the fishhook being removed therefrom;

Fig. 3 is a horizontal transverse sectional view taken on the line 3—3 in Fig. 1;

Fig. 4 is a horizontal transverse sectional view taken on the line 4—4 of Fig. 2; and Fig. 5 is a side elevational view of the attachment shown connected to a fishhook and fastened to a fish line, with the fishhook embedded in an obstacle and the spring in the compresed position preparatory to its being released to dislodge the fishhook from the obstacle.

Referring to the drawing more particularly by reference numerals, 10 indicates generally an attachment constructed in accordance with the teachings of the present invention shown used with a fishhook 12 and a fish line 14.

The attachment 10 includes a U-shaped stationary member 16 of resilient wire-like material which has a body portion 18 and a latch portion 20. Formed integral with the upper end of the body portion 18 is a ring portion 22 which extends toward the latch portion 20. A hook portion 26 is formed integral with the upper end of the latch portion 20 and extends toward the body portion 18 above the ring portion 20.

An elongated movable member 28 is slidably disposed in the ring portion 22. The lower end of the member 28 has a ring portion 30 which surrounds the body portion 18, and the upper end thereof has an eye 32 for receiving the fish line 14.

Disposed about the body portion 18 between the two ring portions 22 and 30 is a coiled spring 34.

As shown in Figs. 1 and 4, the hook portion 26 is normally engaged about the body of the movable member 28 and the fishhook 12 is at the bottom of the U-shaped member 16.

To remove the hook 12 from the attachment 10, the latch member 20 is forced toward the body portion 18 until the end of the hook portion 26 clears the body of the movable member 28. The latch member 20 is then moved sideways and released so that it moves to the position shown in Figs. 2 and 4. The fishhook 12 can then be slipped off the latch portion 20, a different fishhook slipped thereon, and the hook portion 26 reengaged around the body of the movable member 28.

Operation

When the barbed end of the fishhook 12 becomes embedded in an obstacle such as a log, as shown in Fig. 5, the fisherman pulls the fish line 14 taut. This causes the movable member 28 to slide upwardly in the ring portion 22 and the ring portion 30 to slide upwardly on the body portion 18. This compresses the coiled spring 34 between the two ring portions 22 and 30 as shown in Fig. 5.

The fisherman then suddenly releases the fish line 14, thereby causing the force of the compressed spring 34 and the weight of the movable member 28 to be suddenly applied to the shank end of the fishhook 12 by the ring portion 30 striking the shank end of the fishhook 12, so as to dislodge the latter from the log.

The length of the various elements can be varied somewhat so that the eye portion 32 strikes the hook portion 26 in order to transmit the force through the leg element 20, or they can be designed so that both strike simultaneously.

Manifestly, the striking force can be increased by increasing the length of the attachment so as to have a longer and stronger spring with a greater travel, or by increasing the weight of, or adding separate weights to, the movable member 28 to increase its mass.

Thus, it is apparent that there has been provided a novel attachment for fishhooks to aid in releasing them from obstacles in which they have become embedded, which fulfills all of the objects and advantages sought therefor.

It is to be understood that the foregoing description and the accompanying drawing have been given only by way of illustration and example, and that changes and alterations in the present disclosure, which will be readily apparent to one skilled in the art, are contemplated as within the scope of the present invention, which is limited only by the claims which follow.

What is claimed is:

1. An attachment for use with fishhooks, comprising a first member having an elongated body portion with a ring-like portion adjacent one end thereof; a second member having an elongated body portion slidably disposed in said ring-like portion of the first member, said second member having a ring-like portion adjacent one end thereof to slidably receive the body portion of the first member; yieldable means urging the ring-like portions apart; and means associated with said first member for removably fastening a fishhook thereto, said last named means including a latching member having one end thereof resiliently fastened adjacent the end of the first member opposite to the end which has the ring-like portion, the other end of the latching member having a hook-like portion for removable engagement with the body portion of the second member.

2. An attachment for use with fishhooks, comprising a U-shaped member of resilient material including two leg elements having a ring-like portion at the free end of one of its leg elements and a hook-like portion at the free end of the other leg element; an elongated member slidably disposed in said ring-like portion, said elongated member having a ring-like portion adjacent one end thereof to slidably receive one leg element of the U-shaped member; the hook-like portion being adapted to engage about the elongated member; and a coiled spring disposed about one leg element between the two ring-like portions.

3. An attachment for use with fishhooks, comprising a U-shaped member of resilient wire-like material including a pair of leg elements, the free end of one of said leg elements being formed in a ring-like portion and the free end of the other leg element being formed in a hook-like portion; an elongated wire-like member slidably disposed in the ring-like portion, said elongated member having a ring-like portion formed at one end thereof to slidably receive one leg element and an eye-like portion formed at the other end to receive the end of a fish line; the hook-like portion being removably engageable about the elongated member; and a coiled spring disposed about one leg element between the two ring-like portions.

JOSEPH D. SARAKAS.

REFERENCES CITED

The following references are of record in the file of this patent:

UNITED STATES PATENTS

| Number | Name | Date |
|---|---|---|
| 13,649 | Johnson | Oct. 9, 1855 |
| 175,520 | Stevens | Mar. 28, 1876 |
| 1,379,422 | Thorsten | May 24, 1921 |
| 2,153,489 | Whitis | Apr. 4, 1939 |